(12) United States Patent
Fleischman et al.

(10) Patent No.: US 8,931,056 B2
(45) Date of Patent: Jan. 6, 2015

(54) ESTABLISHING PRIVILEGES THROUGH CLAIMS OF VALUABLE ASSETS

(75) Inventors: Eric Fleischman, Redmond, WA (US); Eliot Gillum, Mountain View, CA (US); Matthew Robert Ayers, Seattle, WA (US); Robert Edgar Fanfant, Mercer Island, WA (US); Hakki Tunc Bostanci, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 13/076,908

(22) Filed: Mar. 31, 2011

(65) Prior Publication Data

US 2012/0254946 A1 Oct. 4, 2012

(51) Int. Cl.
*G06F 21/22* (2006.01)
*G11C 7/00* (2006.01)
*H04L 29/06* (2006.01)

(52) U.S. Cl.
CPC .......... *H04L 63/105* (2013.01); *H04L 63/0823* (2013.01)
USPC ............................................... 726/4; 726/17

(58) Field of Classification Search
CPC ... H04L 63/105; H04L 63/0823; H04L 63/08; H04L 63/104; H04W 4/001; G06F 21/6218; G06F 2221/2141; G06F 21/602; G06F 2211/009; G06F 2211/007
USPC ................................................ 726/4, 17–19
See application file for complete search history.

(56) References Cited

U.S. PATENT DOCUMENTS

| 6,178,504 | B1 * | 1/2001 | Fieres et al. ................. 713/164 |
| 2001/0037403 | A1 | 11/2001 | Mougi et al. |
| 2006/0200856 | A1 * | 9/2006 | Salowey et al. .................... 726/5 |
| 2008/0089237 | A1 * | 4/2008 | Molen et al. .................. 370/252 |
| 2008/0285758 | A1 | 11/2008 | Chuprov et al. |
| 2009/0228550 | A1 | 9/2009 | Kawachiya et al. |
| 2010/0058478 | A1 | 3/2010 | Shetty et al. |

OTHER PUBLICATIONS

"A Technical Overview of Windows Media DRM 10 for Devices", Windows Media, Microsoft Corporation, XP-002371223, Sep. 2004.*

(Continued)

*Primary Examiner* — Michael Chao
*Assistant Examiner* — Shu Chun Gao
(74) *Attorney, Agent, or Firm* — Bryan Webster; Kate Drakos; Micky Minhas (57) ABSTRACT

A service accessible by a set of entities may be provided to each entity at a different service level (e.g., with a different set of privileges) based on the privilege level of the entity. However, many users may attempt to perform malicious activities through the service, and may do so with impunity if the penalties of detection are inconsequential. Instead, privilege levels of entities may be established based on the claims of assets having identifiable value. Such claims may be established by submitting an asset identifier to the service, such as proof of a software license identified by the submission of a license key purchased at a substantial cost. The penalties of malicious activities performed by such users may include the invalidation of such asset identifiers. Establishing the privilege levels of respective entities in this manner raises the penalties, and hence the deterrence, of attempted malicious use of the service.

20 Claims, 7 Drawing Sheets (56) References Cited

OTHER PUBLICATIONS

"Description of Windows Genuine Advantage (WGA)"—Published Date: Sep. 14, 2010 http://support.microsoft.com/kb/892130.
Meier; et al., "Explained: Windows Authentication in asp.net 2.0"—Published Date: Nov. 2005 http://msdn.microsoft.com/en-us/library/ff647076.aspx.
Protalinski, Emil, "Microsoft announces free antivirus, limited public beta"—Published Date: Jun. 18, 2009 http://arstechnica.com/microsoft/news/2009/06/microsoft-announces-free-antivirus-beta-this-tuesday.ars.
Microsoft Offers an Online Validation Process That Allows You to Verify That Your Office is Genuine!—Published Date: Sep. 6, 2010, http://windows.org.in/2010/09/microsoft-offers-an-online-validation-process-that-allows-you-to-verify-that-your-copy-of-office-is-genuine/.
"Resolving WGA Validation Issues When Updating Customer PCs"—Retrieved Date: Nov. 3, 2010 http://www.microsoft.com/oem/en/downloads/Pages/wga_validation_issues.aspx.

* cited by examiner

ESTABLISHING PRIVILEGES THROUGH CLAIMS OF VALUABLE ASSETS

BACKGROUND

Within the field of computing, many scenarios involve a set of entities having a privilege level. As a first example, a service may be provided to a set of users, each of which has established a privilege level with the service, and the service may provide to each user a different level of service associated with the privilege level of the user (e.g., in a file-sharing service, a user with a higher privilege level may be allocated a larger amount of storage space, and/or may be granted more extensive access privileges, than a user with a lower privilege level). As a second example, a service may be provided to a set of devices (e.g., a cellular communications network configured to provide communication services to a set of wireless devices), and each device may be associated with a different privilege level (e.g., a first set of high-privilege-level devices provided to users directly by the provider of the service; a second set of privilege-trust-level devices provided to users by companies affiliated with the provider of the service; and a third set of low-privilege-level devices provided to users by unknown companies). Devices with lower privilege levels may be more likely to have been altered and/or used to access the service in unauthorized ways; therefore, higher levels of service may be provided to devices having higher privilege levels than devices having lower privilege levels.

A particular scenario wherein such techniques may be utilized involves the detection and obstruction of attempt to utilize a service in order to achieve a malicious result, such as accessing an account of another entity (e.g., accessing a bank account in order to steal funds, or accessing a web account of a webserver in order to insert advertisements), sending unsolicited bulk email messages ("spam") or performing a distributed denial-of-service ("DDoS") attack on a target. In order to achieve these results on a wide scale, the instigators of such attempts may utilize automated processes, such as brute-force algorithms that attempt to identify security vulnerabilities in services or to guess the identity credentials (such as user ID and password) of the accounts of various individuals. The administrators of such services may utilize various techniques to verify that an entity requesting access to the service is a human and not an automated process. As one such technique, a "captcha" mechanism may be utilized, wherein an image is generated and presented that is difficult for an automated process to interpret, but that is comparatively easy for a human to interpret (e.g., text presented in a distorted manner on a noisy background). The service may be provided to the entity only after presenting a correct identification of the content of the image.

Within these and other scenarios, many techniques may be used to identify and update the privilege level associated with a particular entity. For example, different levels of identity verification may be utilized to establish the identity of a user or device with a higher degree of confidence (e.g., requesting and verifying increasingly personal, private, sensitive, and/or extensive levels of information about the user, or inspecting the components of a device with finer granularity). For example, in order to verify the identity of the entity with a higher degree of confidence, captcha techniques may present a more lengthy or more complex captcha, or may inspect the response of the entity with a higher degree of precision. The privilege level of the entity may be established according to the confidence established in the entity, and may be used in various ways (e.g., to determine the degree of service provided to the entity).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In order to establish a privilege level of an entity, a service may examine, test, and verify many types of information about the entity. In particular, it may be advantageous to establish the identity of an entity based on an association of the entity with assets having a real-world cost and value. For example, when a user requests to create an account with a service, the service may request the user to identify one or more purchased items, e.g., receipts of items purchased in retail stores. The level of privileges (and possibly service) associated with the user may therefore be selected based on the total value (and possibly reliability) of the identified assets. This technique may be particularly difficult for malicious users to circumvent. For example, an automated algorithm may be unable to register many accounts in an automated manner, because the availability of such assets that may be identified to the service may be limited.

Accordingly, it may be advantageous to configure a service to establish and update the privilege levels of various entities based on the assets associated with various entities, and the total value of such assets. For example, the assets may comprise software licenses of various software products, each of which may be identified according to an asset identifier (e.g., a license key or a registration number) that has been purchased in exchange for a particular value (e.g., the license cost of the asset identifier). The service may request the entity to identify a set of such asset identifiers, may verify each asset identifier, and may set the privilege level of the entity according to the number and value of the identified assets. The service may then use the identified privilege level of the entity in various ways, e.g., to select a quality level of the service provided to the entity. The use of such techniques to establish the privilege level of an entity may be particularly difficult to circumvent, and may therefore present a more reliable privilege level of the entity than may be identified by alternative techniques.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a representation of a set of entities (such as users or devices) where each entity is associated with a level of privileges. This level of privileges may be set according to various factors, e.g., the confidence in the security of the entity (such as a security clearance level of a user, or the strength of the security and integrity mechanisms implemented on a device) and/or the confidence in the authentication of the entity (such as the strength of the security mechanisms guaranteeing that communications received from an entity were authored by that entity, and were not forged or tampered with by another entity).

The levels of privileges may be used by the service in many ways. As one example, a service may be provided to a set of entities, such as an email service configured to receive, store, and send email messages on behalf of such entities; a file service configured to receive, store, and send files to such entities; and an application service configured to install and maintain applications stored on devices (where either the devices or the users of such devices are identified as entities). The entities utilizing a service are attributed different levels of privileges, and the service may be configured to provide different levels of service on behalf of such entities. For example, in a file service, an entity with a higher privilege level may be permitted to store more and/or larger files, to share such files with more users, and/or to download more files shared by other users than an entity with a lower privilege level.

One scenario where such techniques may be particularly advantageous comprises the defense of a service against misuse. In many contemporary scenarios, a malicious user may attempt to misuse a service in various ways. As a first example, an email service may be configured to send messages to other users, and a malicious user may seek to send bulk unsolicited email messages ("spam") to other users through the email service. As a second example, a chat service may allow users to exchange chat messages, and a malicious user may seek to send messages comprising advertisements to other users. As a third example, a file service may allow users to store files, and a malicious user may seek to store the assets involved in malicious activity, such as executable binaries that may be invoked to execute a distributed denial-of-service (DDoS) attack on a targeted server, tools used to co-opt other servers (such as rootkits and bot software), or illegal objects (such as copies of copyrighted works that are to be shared with other users). In each of these examples, the user may seek to create an account with the service through which the malicious activity may be performed. Moreover, the service monitors and reviews the activities of various accounts and shuts down accounts that are misused, but the malicious user may endeavor to circumvent these security measures by automatically registering a larger number of accounts than may be monitored by the service. In this manner, malicious users are frequently able to establish and continue the misuse of the service despite careful policing of account activities.

Additional security measures have been implemented to discourage or diminish the automatic registration and use of accounts on various services. As one such example, "reverse Turing tests" are often utilized to verify that an entity requesting a secured activity of the service, such as registering an account or downloading a file, is a human and not an automated process. Techniques directed to this example include "captcha" technology, wherein the service generates and presents to the entity a media object containing a signal that is obscured by noise, such as an image including words presented on a cluttered background or an audio recording including spoken words with considerable background noise. Because the sensory processing systems of humans are considerably more proficient at extracting such signals from noise than contemporary automated processes, the service may conclude that entities that correctly identify the signal of the "captcha" are humans and may perform the requested services. In this manner, the service may perform such secured activities only in response to requests from humans, and may therefore discourage the invocation of the activities by automated processes that may misuse the service.

Figure 1:
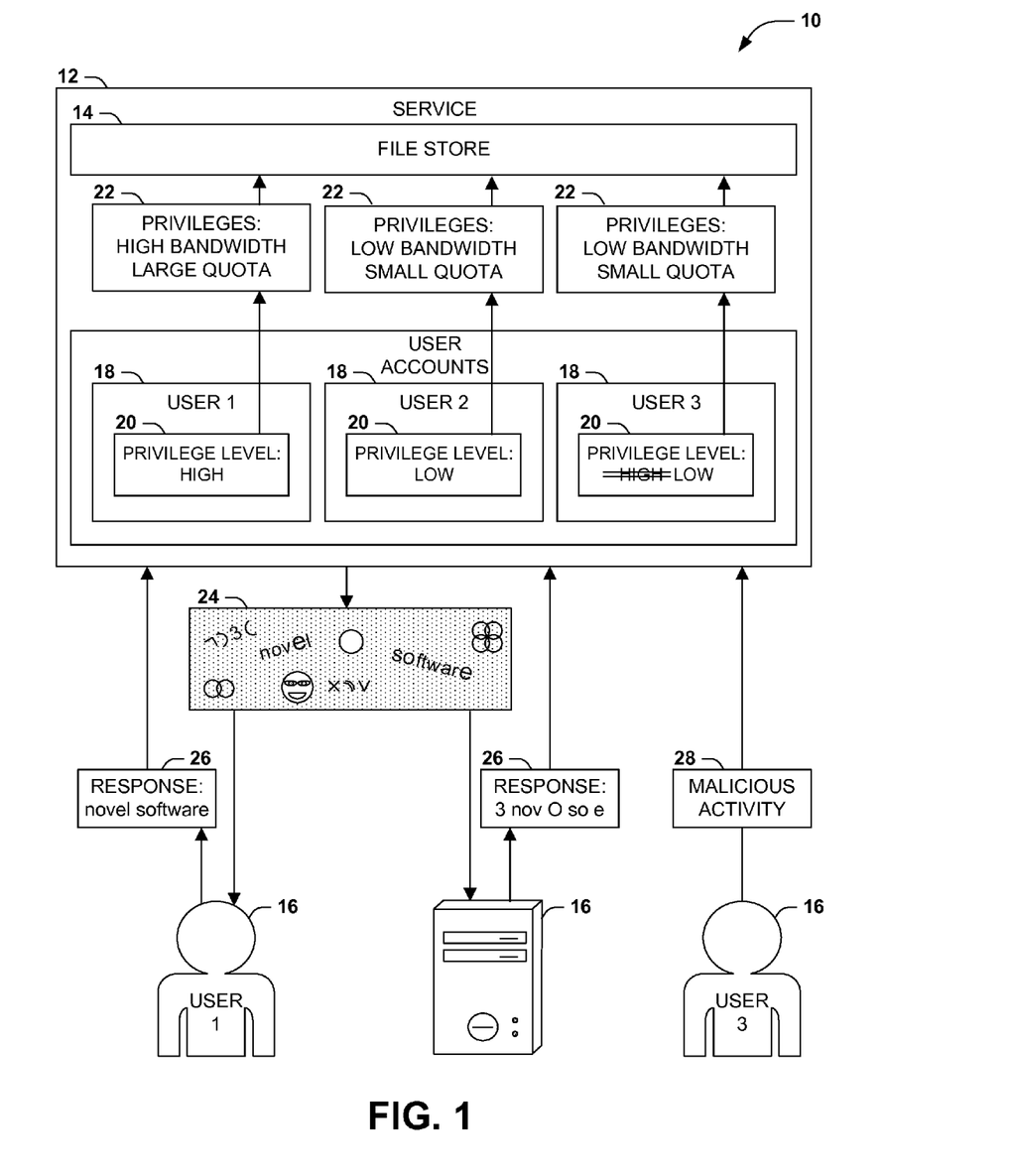
FIG. 1 is an illustration of an exemplary scenario featuring an assignment of privilege levels to entities utilizing a service.

FIG. 1 presents an exemplary scenario 10 featuring the use of a "captcha" technique to secure a service 12 configured to share files stored in a file store 14. In this exemplary scenario 10, the service 12 receives requests to perform various activities from one or more entities 16. Such entities 16 may comprise humans or automated processes, and the requested activities may include authorized activities (e.g., storing or accessing innocuous files) as well as malicious activities 28 (e.g., storing or accessing illegal or harmful files). In order to reduce misuse, the service 12 may store a user account 18 for each entity 16, and may only accept requests to perform activities that are received from an entity 16 having a user account 18. Moreover, each user account 18 may be associated with a privilege level 20 indicating the confidence of the service 12 that the represented entity 16 is not performing malicious activities. Such privilege levels 20 may be adjusted based on the activities of the entities 16; e.g., entities 16 that are identified as automated processes masquerading as humans, or as having recently attempted to perform malicious activities 28, may be reduced, while entities 16 that are verified as humans and that have a history of performing authorized activities 28 may be elevated. The service 12 may use the privilege levels 20 of the various user accounts 18 to choose a set of privileges 22, such as the types of activities that may be performed within the service 12, that are permitted by the represented entity 16. For example, for entities 16 having a high privilege level 20, the service 12 may choose a broad set of privileges 22, such as transferring files with high bandwidth and assigning a large storage quota that permits the storage of a large volume of data; but for entities 16 having a low privilege level 20, the service 12 may choose a restricted set of privileges 22, such as transferring files with low bandwidth and assigning a small storage quota that permits the storage of only a small volume of data. In this manner, entities 16 that are not fully privileged may be permitted to access the service 12 only in restricted ways, thereby reducing the potential for misuse of the service 12.

As further illustrated in the exemplary scenario 10 of FIG. 1, the service 12 may establish and adjust the privilege levels 20 of various user accounts 18 based on various activities performed by the represented entities 16. As a first example, the service 12 may present a captcha 24 in order to verify that each entity 16 is a human and not an automated process. This captcha 24 may be presented when an entity 16 requests to perform a secured activity, such as the creation of a new user account 18 for the entity 16. For example, when a first entity 16 (comprising a human) requests to create a user account 18, the service 12 may generate a captcha 24 and send it to the first entity 16 with a request to identify a signal presented in the captcha 24 (e.g., the human-readable words presented against the noisy background). When the first entity 16 provides a response 26 that correctly identifies the signal (e.g., the readable words) of the captcha 24, the service 12 may determine that the first entity 16 is a human, and may assign high privilege level 20 to the user account 18 of the first entity 16. By contrast, when a second entity 16 (comprising an automated process) requests to create a user account 18, the service 12 may send the same captcha 24 to the second entity 16, but upon receiving a response 26 that incorrectly identifies the readable text (e.g., identifying characters that are often incorrectly identified as readable text by conventional optical character recognition (OCR) technologies), the service 12 may determine that the second entity 16 is an automated process, and may assign a low privilege level 20 to the user account 18 of the second entity 16 (or may simply refuse to create a user account 18 for the second entity 16). Moreover, the service 12 may continue to monitor the activities of the entities 16 and may accordingly adjust the privilege levels 20 of the user accounts 18. For example, when a third entity 16 having a high privilege level 20 requests to perform a malicious activity 28, the service 12 may reduce the privilege level 20 of the user account 18 of the third entity 16, and may therefore reduce the set of privileges 22 extended to the third entity 16.

While the exemplary scenario 10 of FIG. 1 presents some advantages of captcha techniques, some disadvantages and limitations of captcha techniques may limit the effectiveness thereof in securing the service 12. As a first example, captcha techniques may present many false positives (incorrectly identifying humans as automated processes) and false negatives (incorrectly identifying automated processes as humans). Such inaccuracies may become more prevalent as malicious users become more adept at designing automated processes that correctly answer captchas, such as utilizing increasingly sophisticated optical character recognition (OCR) and speech recognition technologies. As a second example, humans may find captchas to be irritating, particularly as the difficulty of captchas increases to thwart increasingly sophisticated automated processes. As a third example, captchas are ineffective at discouraging malicious activities performed by humans, and "mechanical Turk" solutions (utilizing humans to answer such challenges correctly) to captchas may permit malicious users to circumvent the security measures of such services.

In view of these limitations, the development of alternative techniques for securing the use of services 12 may be advantageous. It may be appreciated that in such scenarios, malicious users are able to utilize such techniques as the widespread automation of user account registration because the costs of failure are insignificant. That is, the cost to a malicious user of a failed attempt to misuse a service 12 is trivial, and even if only a small percentage of such attempts succeed, the value of the successful attempts outweighs the cost of the unsuccessful attempts. As one exemplary scenario where this value proposition affects the tactics utilized by malicious users, unsolicited bulk email messages ("spam") that are broadcast to users typically achieve a very low response rate (such as click-throughs to advertised websites)—often below one response per 10,000,000 messages sent—but the collective value of the responses may considerably exceed the trivial cost of sending all of the messages, resulting in a very profitable misuse of email services. Therefore, tactics that may be effective at reducing misuse of a service involve increasing the cost of a failed attempt to a non-trivial level. For example, opponents of spam email messages occasionally propose a small per-message cost (such as $0.01) of sending email messages, which may not significantly impact the senders of legitimate email messages, but which may render the sending of spam highly unprofitable. However, solutions that directly attribute a cost to the secured activity may undesirably penalize entities that legitimately perform a large number of secured activities (e.g., a per-message fee may significantly impact the sender of a widely popular electronic newsletter).

In view of these characteristics, the techniques presented herein involve associating a privilege level 20 with an entity 16 with one or more assets of value. For example, when an entity 16 requests to generate a user account 18, a service 12 may request the entity 16 to identify one or more assets having an identifiable value, such as purchases of goods or services or ownership of objects or real estate. Such identification may be asserted by the entity 16 in various ways, e.g., by providing proof of a financial transaction (such as a copy of a receipt) or an identifier of ownership of the asset. The service 16 may then assign a privilege level 20 to the entity 16 according to the assets claimed by the entity 16. As one such example, the privilege level 20 assigned to the entity 16 may be proportional to the total value of the assets claimed by the entity 16 (e.g., claims of low-value assets may result in a small elevation of the privilege level 20 of the entity 16, while claims of high-value assets may result in a large elevation of the privilege level 20 of the entity 16). If the entity 16 later performs a malicious activity 28 that diminishes the privilege level 20 of the entity 16 (or even results in a revocation of the user account 18 of the entity 16), the service may also invalidate the claimed assets. This invalidation may simply involve a refusal to associate such assets with other entities 16, or may further have an impact on the claimed asset; e.g., if the asset has been purchased from the service 12, the asset may be cancelled or diminished. In this manner, an entity that performs a malicious activity 28 may suffer a significant loss of value with respect to the claimed assets, thereby increasing the costs of malicious activities 28 (particularly in comparison with contemporary techniques that involve a trivial penalty for such malicious activities 28). Moreover, because the presented assets have been purchased by respective entities 16 in separate transactions (unrelated to the performance of the secured activities), the per-activity cost of performing the secured activities is not directly assessed to the entities 16, and does not unduly impact entities 16 that perform a large number of legitimate activities.

Figure 2:
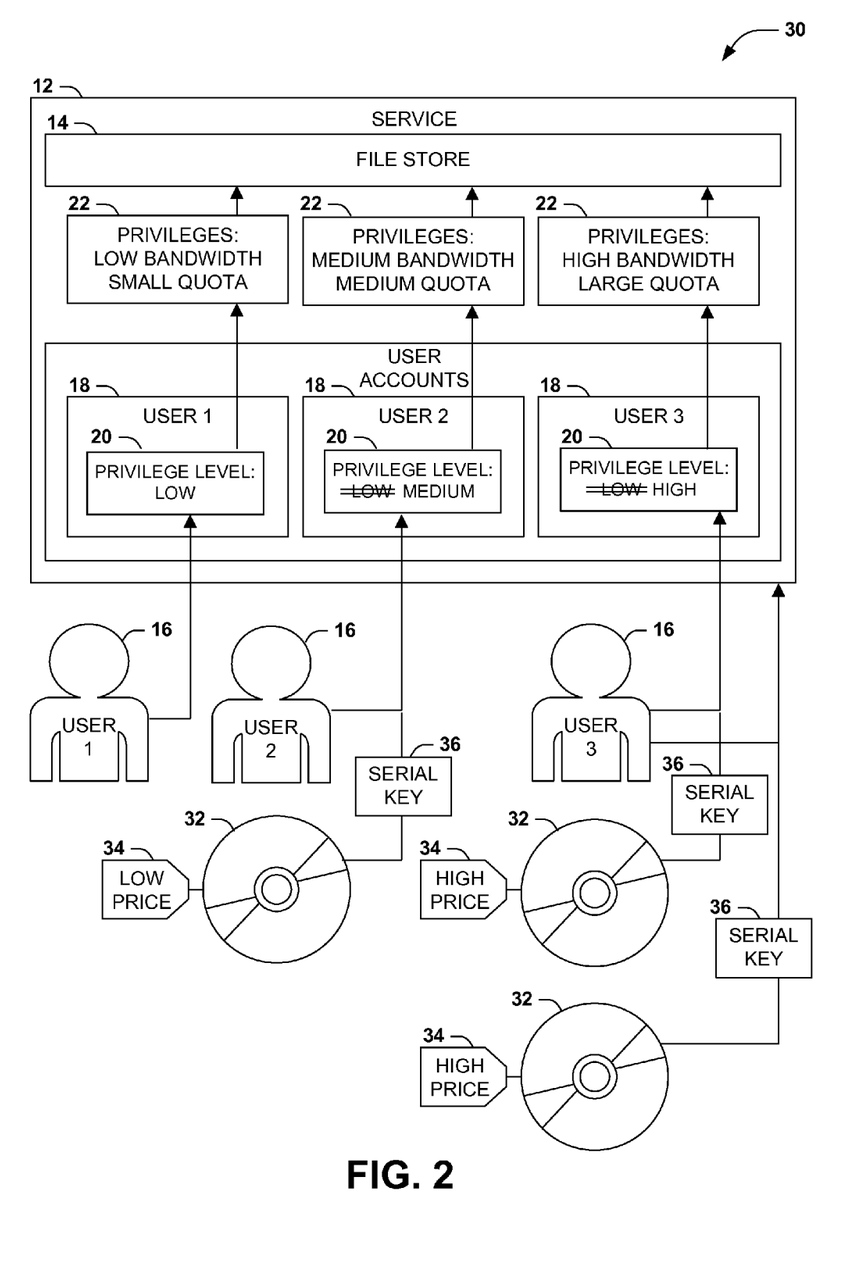
FIG. 2 is an illustration of an exemplary scenario featuring an assignment of privilege levels to entities utilizing a service in accordance with the techniques presented herein.

FIG. 2 presents an illustration of an exemplary scenario 30 featuring an assignment of privilege levels 20 to entities 16 based on claims of assets 32 having a particular value 34. In this exemplary scenario 30, a service 12 again comprises a file store 14 configured to receive, store, and transmit files to various entities 16. The service 12 is also configured to provide the file service to each entity 16 having a particular set of privileges 22 associated with a privilege level 20 assigned to a user account 18 of the entity 16. In accordance with the techniques presented herein, the privilege levels 20 of the entities 16 are assigned based on claims of assets 32. In this exemplary scenario 30, the assets 32 claimed by the entities 16 comprise licenses purchased for various software products and/or services, such as operating systems, software applications, and internet services (e.g., web hosting and file service). The assets 32 are purchased by respective entities 16 at a cost, thereby attributing to the assets 32 a particular value 34 (e.g., a high value 34 associated with an expensive license to a first software product, and a low value 34 associated with an inexpensive license to a second software product). For example, when a first entity 16 requests to register a user account 18 with the service 12, the service 12 initially assigns a low privilege level 20 to the first entity 16, which is associated with a correspondingly small set of privileges 22, such as a small file storage quota and the capability of transferring files of the file store 14 at low bandwidth. A second entity 16 may request to register a user account 18 with the service 12 (or to elevate a privilege level 20 of the user account 18), and may submit an asset identifier 36 of an asset 32, such as a license key identifying a license to a software product, which may have been purchased by the second entity 16 at a particular value 34. The service 12 may respond to the request of the second entity 16 by verifying the asset identifier 36 (e.g., verifying that the license key is valid and has not been claimed by another entity 16), and, upon verifying the asset identifier 36 of the asset 32, may elevate the privilege level 20 of the user account 18 of the second entity 16. Moreover, the privilege level 20 may be elevated proportionally to the value 34 of the asset 32 (e.g., the cost of obtaining the license to the software product). Thus, if the second entity 16 submits an asset identifier 36 of an asset 32 having a comparatively low cost, the service 12 may elevate the privilege level 20 of the user account 18 of the second entity 16 to a medium privilege level 20, thereby granting to the second entity 16 an extended set of privileges 22 including a medium-sized file storage quota and the capability of transferring files of the file store 14 at medium bandwidth. Similarly, if a third entity 16 submits several asset identifiers 36 of assets 32 having a high value 34 (e.g., high-cost licenses of software products), the service 12 may elevate the privilege level 16 of the third entity 16 to a high privilege level 16, and may grant a broad set of privileges 22, including a large file storage quota and the capability of transferring files of the file store 14 at high bandwidth.

In this manner, and in accordance with the techniques presented herein, the exemplary scenario 30 enables an assignment of privilege levels 20 of various entities 16 utilizing a service 12 according to the value 34 of respective assets 32 asserted by the entities 16. Because each user account 18 is now associated with valuable assets, the entities 16 are discouraged from performing malicious activities 28, because the service 12 may respond by penalizing the entity 16 with respect to those valuable assets 32. The penalty may simply involve restricting user accounts 18 associated with the assets 32, and/or refusing to register additional user accounts 18 with the assets 32. However, more stringent penalties may also be enforced; e.g., the service 12 may be able to invalidate the asset identifiers 36 of the assets 32 (e.g., invalidating the license of the software product purchased by the entity 16), and/or may be able to identify the individual who has attempted to perform a malicious activity 28 based on the asset 32 (e.g., identifying an individual who has performed an illegal activity through the service 12 based on a credit card used to purchase the asset 32 claimed by the entity 16). Moreover, an entity 16 intending to perform a malicious activity 28 may be deterred by the threat of invalidation of the assets 32, and attempts to perform malicious activities 28 may therefore be rendered unprofitable or not worthwhile.

Figure 3:
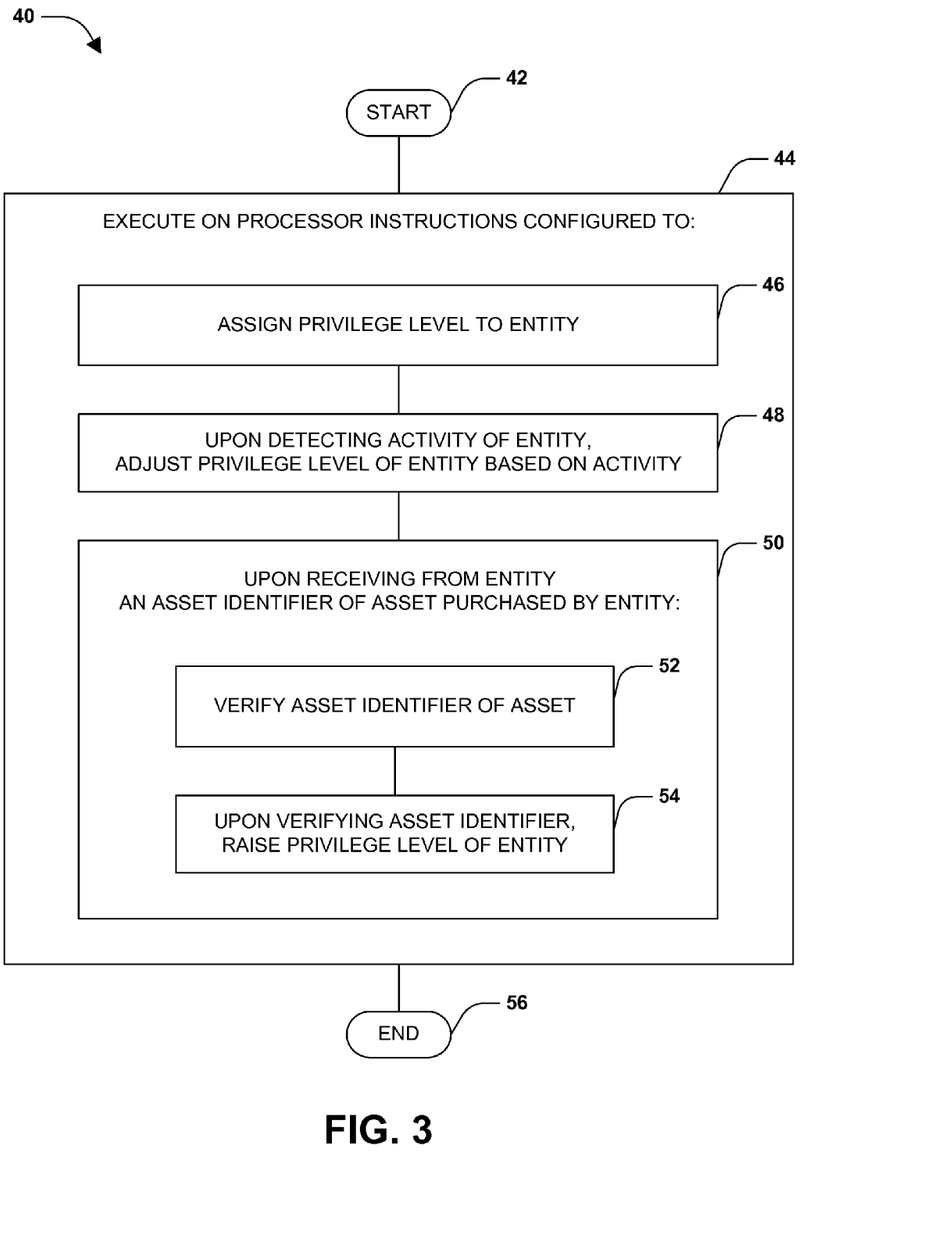
FIG. 3 is a flow chart illustrating an exemplary method of assigning privilege levels to entities.

FIG. 3 presents a first embodiment of these techniques, illustrated as an exemplary method 40 of identifying a privilege level 20 of an entity 16. The exemplary method 40 may be performed using a device having a processor, and may be implemented, e.g., as a set of software instructions stored in a memory of the device (e.g., a memory circuit, a platter of a hard disk drive, a solid-state storage device, or a magnetic or optical disc) that embody the techniques presented herein. The exemplary method 40 begins at 42 and involves executing 44 the instructions on the processor. In particular, the instructions involve assigning 46 a privilege level 20 to the entity 16, and upon detecting an activity of the entity 16, adjusting 48 the privilege level 20 of the entity 16 based upon the activity. The instructions also involve, upon receiving from the entity 16 an asset identifier 36 of an asset 32 purchased by the entity 16, verifying 50 the asset identifier 36 of the asset 32, and upon verifying the asset identifier 36, raising 52 the privilege level 20 of the entity 16. In this manner, the exemplary method 40 assigns privilege levels 20 to entities 16 based on claims of assets 32 having a particular value 34 in accordance with the techniques presented herein, and so ends at 54.

Figure 4:
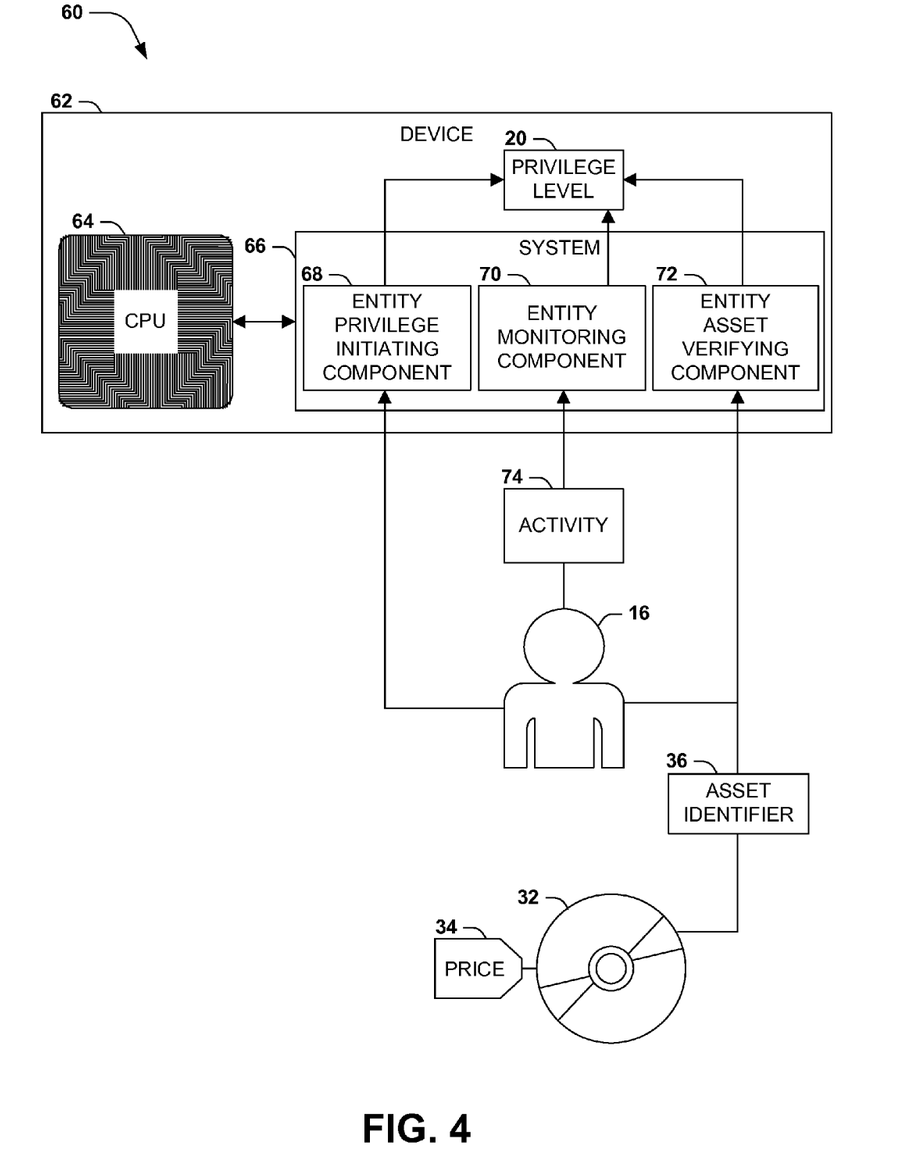
FIG. 4 is a component block diagram illustrating an exemplary system for assigning privilege levels to entities.

FIG. 4 presents a second embodiment of these techniques, illustrated as an exemplary system 66 operating within an exemplary scenario 60 featuring an assignment of privilege levels 20 to entities 16 based on a claim of an asset 32 having a value 34. The exemplary system 66 operates on a device 62 having a processor 64, and may be implemented, e.g., as a set of interoperating modules that together implement the techniques presented herein. Respective interoperating modules may comprise, e.g., a set of instructions stored on a memory component of the device 62 (e.g., a memory circuit, a platter of a hard disk drive, a solid-state storage device, or a magnetic or optical disc) that, when executed by the processor 64, interoperate with one or more other components of the system 66 to achieve one or more tasks associated with the techniques presented herein. The exemplary system 66 includes an entity privilege initiating component 68, which is configured to assign a privilege level 20 to the entity 16. The exemplary system 66 also includes an entity monitoring component 70, which is configured to, upon detecting an activity 74 of the entity 16, adjust the privilege level 20 of the entity 16 based upon the activity 74. The exemplary system 66 also includes an entity asset verifying component 72, which is configured to, upon receiving from the entity 16 an asset identifier 36 of an asset 32 purchased by the entity 16, verify the asset identifier 36 of the asset 32, and upon verifying the asset identifier 36, raise the privilege level 20 of the entity 16 (e.g., proportionally with respect to the value 34 of the asset 32). In this manner, the components of the exemplary system 66 of FIG. 3 interoperate to achieve the assignment of privilege levels 20 to entities 16 based upon claims of assets 32 asserted thereby, in accordance with the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
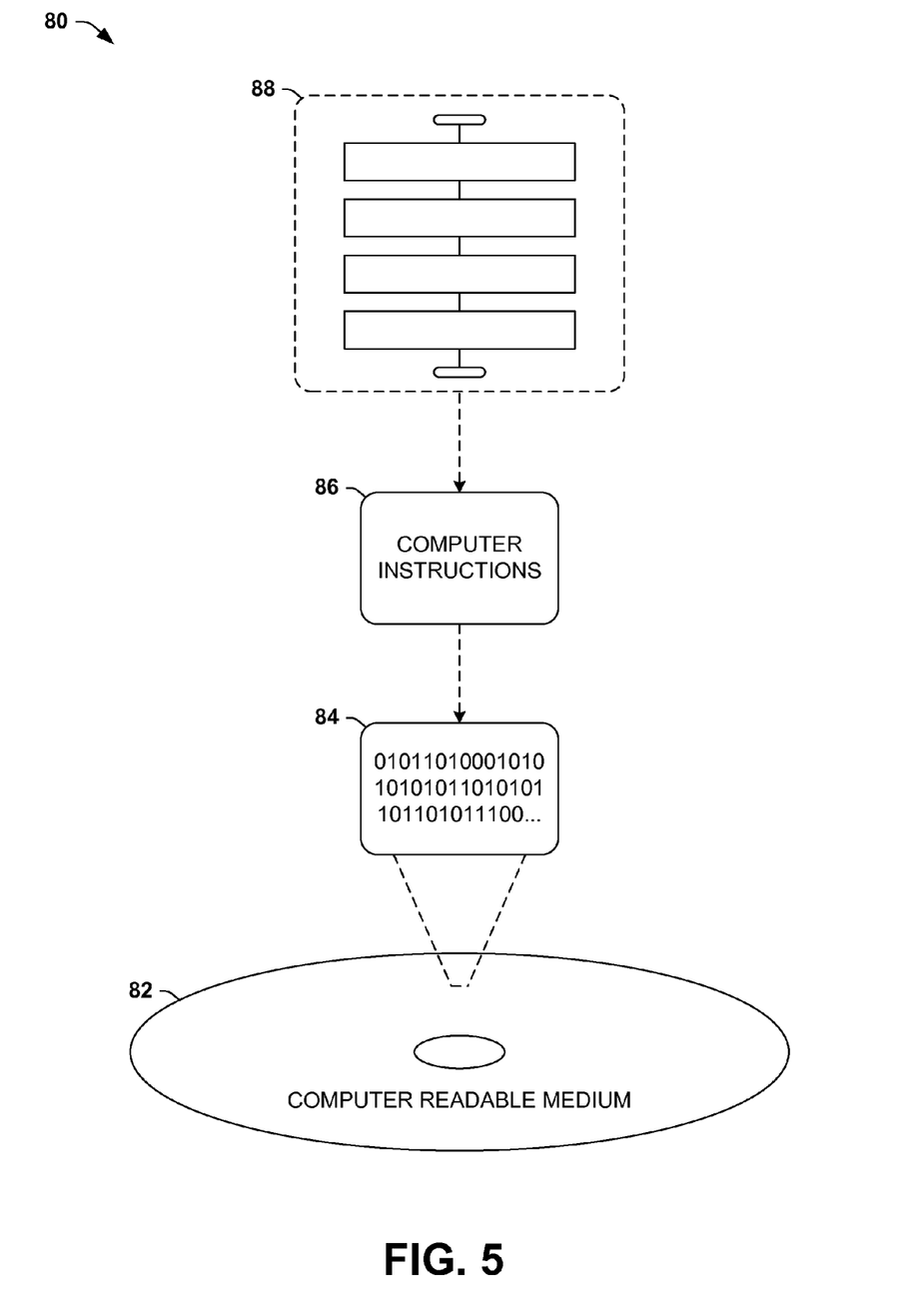
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 80 comprises a computer-readable medium 82 (e.g., a CD-R, DVD-R, or a platter of a hard disk drive), on which is encoded computer-readable data 84. This computer-readable data 84 in turn comprises a set of computer instructions 86 configured to operate according to the principles set forth herein. In one such embodiment, the processor-executable instructions 86 may be configured to perform a method of assigning privilege levels to entities, such as the exemplary method 40 of FIG. 3. In another such embodiment, the processor-executable instructions 86 may be configured to implement a system for assigning privilege levels to entities, such as the exemplary system 66 of FIG. 4. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary system 66 of FIG. 4) to confer individual and/or synergistic advantages upon such embodiments.

A first aspect that may vary among embodiments of these techniques relates to the scenarios wherein such techniques may be utilized. As a first example, these techniques may be utilized to establish privilege levels 20 of many types of entities 16, such as individuals, groups of individuals, organizations, corporations, devices, and automated processes. As a second example of this first aspect, many types of privilege levels may be established (e.g., discrete levels, ratings, or scores), and such privilege levels 20 may be based on many types of information (e.g., the history, number, and types of activities 74 undertaken by the entity 16, and the reputation of the entity 16 among other entities 16). As a third example of this first aspect, the privilege level 20 may be used to establish many criteria of a service provided to respective entities 16, such as the amount of data that may be exchanged between the entity 16 and the service (e.g., a maximum volume of data that may be stored by a file service on behalf of an entity 16), the number and types of requests that may be made by the entity 16 of the service (e.g., the number and types of email messages that may be sent on behalf of an entity 16 by an email service in a particular period), and the privileges of the entity 16 within the service to perform certain types of activities 74 (e.g., read and/or write access extended to the entity 16 to particular portions of a file system stored by a file service). As one such example, the entity 16 may be provided a service having a service quality associated with a privilege level 20 (e.g., a resolution or framerate provided for a video streaming service, or an audio quality provided for a voice-over-IP (VOIP) telephony service), and the service may be provided to any particular entity 16 with a service quality associated with the privilege level 20 of the entity 16.

As a fourth example of this first aspect, many types of assets 32 may be claimed by respective entities 16, such as goods purchased at a retail or online store, services purchased from a service provider, and goods or services acquired by the entity 16 from other entities 16 at an identifiable cost). It may be appreciated that, in some scenarios, the cost of the assets 32 claimed by such entities 16 may significantly relate to the advantages of the techniques presented herein. For example, these techniques may be utilized to discourage entities 16 from performing malicious activities 28 by associating a detection of such malicious activities 28 by the service with an impact on the claimed assets 32, such as the inability to claim such assets 32 for use with other accounts established by the same or another entity 16. In particular, if the asset 32 comprises a license purchased at an identifiable cost for access to a software asset (such as an account purchased for an online service or a permission to play an online game), the response to the detection of the malicious activity 28 may involve restricting, suspending, and/or invalidating the license, thereby imposing a non-trivial penalty on the entity 16 performing the malicious activity 28. Moreover, the risks of incurring such penalties may significantly deter entities 16 from attempting such malicious activities 28. In such scenarios, it may be appreciated that the magnitude of the punitive and/or deterrent effect is related to the identifiable cost of the asset 32; e.g., assets 32 that are available at a low or free cost may impose little or no punitive and/or deterrent effect, but assets 32 that are only available at a significant cost may impose a correspondingly significant effect on entities 16 who may otherwise attempt or perform malicious activities 28. Thus, if the asset 20 is purchased by the entity 16 at an asset cost, an embodiment of these techniques may be configured to raise the privilege level 20 of the entity 16 proportional to the asset cost of the asset 32. For example, an entity 16 that wishes to gain a significant increase in privilege level 20 (and a corresponding increase in the service quality of a service provided to the entity 16) may claim one or several assets 32 of high value as collateral provided in exchange for the high privilege level 20.

As a fifth variation of this first aspect, the verification of the asset claim to the asset 32 may arise within many aspects of a service. As a first such variation, the claim of one or more assets 32 may be established as a condition of providing the service to an entity 16. Alternatively, the service may initially be provided at a low service quality to an (unprivileged) entity 16, but the entity 16 may secure a higher service quality by claiming one or more assets 32. As a second alternative, the claim of one or more assets 32 may be provided as one of several mechanisms for securing a higher privilege level 20. For example, the service may permit an entity 16 to achieve a higher privilege level 20 in many ways, including the completion of one or more alternative verification techniques (e.g., one or more captchas 24), the claim of one or more assets 32, or simply by interacting with the service in a non-malicious manner for an extended period of time. The provision of alternative mechanisms for establishing and raising the privilege level 20 of the entity 16 may be appealing to entities 16 utilizing the service. Those of ordinary skill in the art may devise many scenarios wherein the techniques presented herein may be advantageously utilized.

A second aspect that may vary among embodiments of these techniques relates to the manner of verifying an asset 32 claimed by an entity 16. As a first example, the entity 16 may submit evidence of a financial or other type of transaction, such as a receipt. An embodiment of these techniques may verify the evidence (e.g., by contacting another entity 16 involved in the transaction, such as another party involved in the transaction or a bank through which payment was processed), and, upon verifying the evidence, may increase the privilege level 20 of the entity 16. As a second example of this second aspect, the entity 16 may have an account associated with various assets 32 (e.g., a credit card through which various transactions have been processed, or a purchase account through which purchases of one or more assets 32 have been made), and may claim the associated assets 32 simply by demonstrating ownership of the specified account.

As a third example of this second aspect, an entity may claim an asset 32 by tendering an identifier of the transaction. In particular, where the asset 32 comprises a software license of a software asset, the asset identifier 36 of the asset 32 may comprise a software license certificate representing the software license of the software asset. The software license certificate may comprise a certificate that has been cryptographically signed by the issuer of software licenses to the software asset, or may comprise a license key that the entity 16 may provide to an installed copy of the software asset in order to demonstrate proof of licensing. In these and other scenarios, the software license certificate may be verifiable by a software licensing service, and an embodiment may verify the asset identifier 36 by sending it to the software licensing service, and receiving from the software licensing service a verification of the software license certificate.

In some scenarios where an entity 16 may frequently submit requests for activities 74 for which a privilege level 20 is to be verified, an embodiment of these techniques may repeatedly verify the asset identifiers 36 of assets 32 claimed by the entity 16. However, such repeated verification may be unduly resource-intensive (e.g., imposing a complex verification process involving a significant expenditure of computing resources, and/or imposing an undesirable delay upon the completion of the activity 74). Alternatively or additionally, in some scenarios, a first device or service may be configured to verify claimed assets 32 while a second device or service may be configured to perform requested activities 74 (based on a previously verified privilege level 20 of the entity 16 requesting the activity 74). In still other scenarios, a service configured to verify assets 32 and/or perform requested activities 74 may be configured to operate in a stateless manner. For example, instead of locally storing information identifying the privilege levels 20 of respective entities 16, the service may send information to the entity 16 identifying its privilege level 20; and when the entity 16 later requests to perform an activity 74, the service may request and receive from the entity 16 the information identifying its privilege level 20, and may examine the information in order to determine the privilege level 20 of the entity 16 while evaluating whether to perform the requested activity 74.

In view of these considerations, some embodiments of these techniques may utilize verification tickets, comprising a temporary identifier of a verified asset identifier 36 that may be stored on a device of the entity 16. When the entity 16 claims an asset 32, the embodiment may verify the asset 32, and may then generate and send to the entity 16 a verification ticket that identifies the asset claimed by the entity 16 and/or the privilege level 20 of the entity 16 associated with the claimed asset 32. The verification ticket may be generated, e.g., as a cookie stored within a web browser of a device of the entity 16, and may include a cryptographic signature of the generating service (in order to verify authenticity and an absence of tampering with the contents of the verification ticket by the entity 16). The service may subsequently verify an asset identifier of the entity 16, and/or identify a privilege level 20 of the entity 16 (e.g., while evaluating a request from the entity 16 to perform a requested activity 74), by requesting, receiving, and examining the verification ticket stored by the entity 16. In this manner, the embodiment may utilize verification tickets to facilitate the verification of the privilege levels 20 of respective entities 16.

Figure 6:
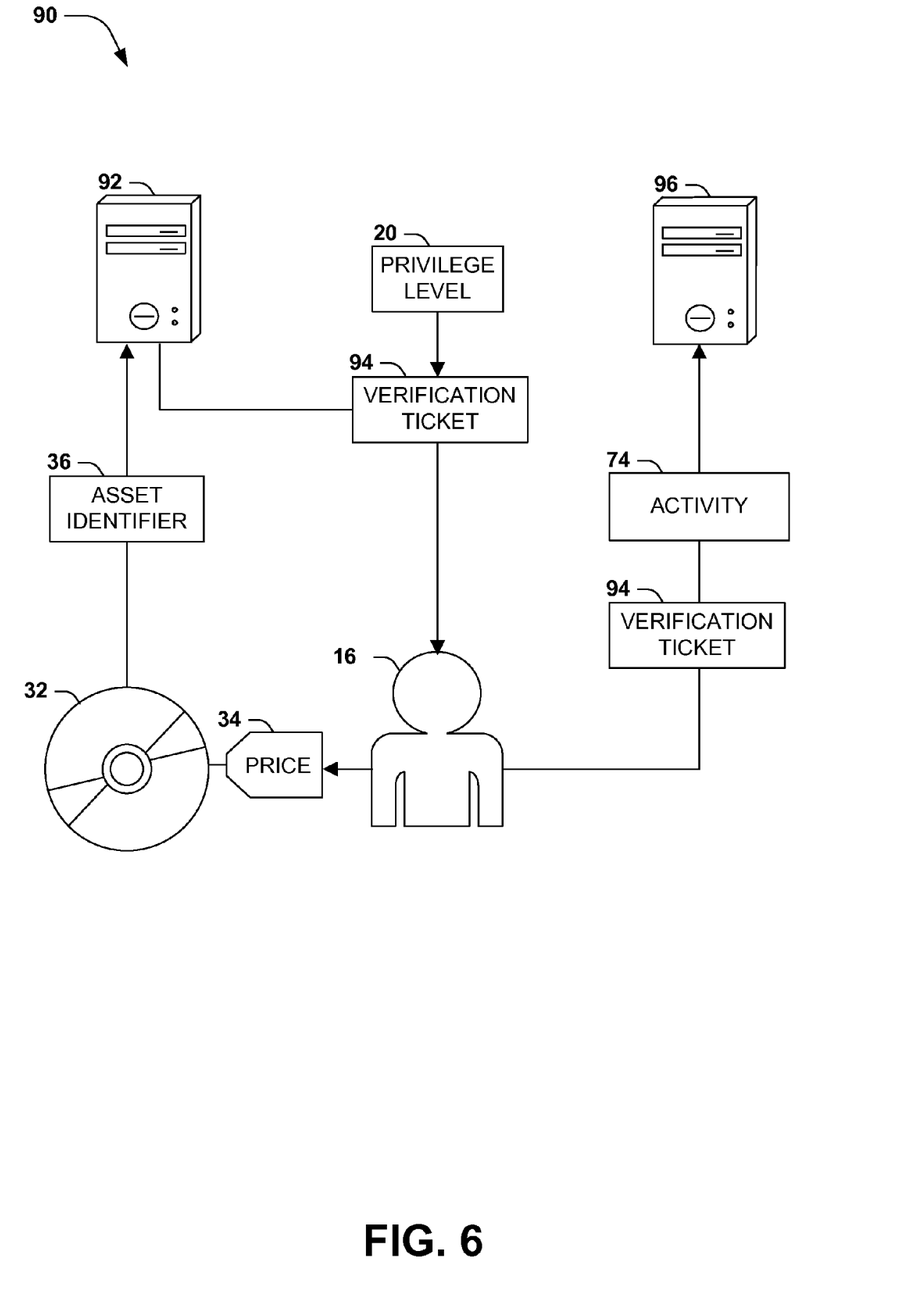
FIG. 6 is an illustration of an exemplary scenario featuring the use of verification tickets to identify assets claimed by entities and privilege levels accordingly assigned thereto.

FIG. 6 presents an illustration of an exemplary scenario 90 featuring the use of verification tickets 94 to track the privilege level 20 assigned to an entity 16. In this exemplary scenario 90, a first server 92 is configured to assign privilege levels 20 to entities 16 by verifying asset identifiers 36 of various assets 32 claimed by an entity 16. For example, when an entity 16 purchases an asset 32 having a particular value 34, the entity 16 may claim the asset 32 by submitting an asset identifier 36 (e.g., a license key of a software license) to the first server 92, which may be configured to verify the asset identifier 36 and to generate and send to the entity 16 a verification ticket 94 identifying a privilege level 20 assigned to the entity 16 based on the claimed asset 32. The verification ticket 94 may also be cryptographically signed by the first server 92, thereby authenticating the verification ticket 94 as having been generated by the first server 92, and/or providing a mechanism to determine whether the contents of the verification ticket 94 have been altered since generation. A device operated by the entity 16 may store the verification ticket 94. The entity 16 may later request an activity 74 from a second server 96, such as a server configured to provide a file service or an email service, and may also send the verification ticket 94 with the request to perform the activity 74. The second server 96 may determine whether the entity 16 is permitted to perform the activity 74 by examining the verification ticket 94 to verify its authenticity and/or unaltered state, and, if successful, may identify the privilege level 20 of the entity 16 assigned by the verification ticket 94. The techniques presented in this exemplary scenario may facilitate the efficient determination of the privilege level 20 of the entity 16 (particularly where the first server 92 performs the verification of asset identifiers 36 and the assignment of privilege levels 20, and where the second server 96 may simply verify the contents of the verification ticket 94 as part of the request by the entity 16 to perform the activity 74), and/or for permitting the assignment of privilege levels 20 in a stateless manner (e.g., such that neither the first server 92 nor the second server 96 may store information about the privilege level 20 assigned to the entity 16).

In some scenarios, verification tickets 94 may be generated without restrictions; e.g., a verification ticket 94 generated by a server may simply comprise an identification of an asset 32 claimed by an entity 16, and possibly also the privilege level 20 assigned to the entity 16 as a result of the claimed asset 32. However, in other scenarios, verification tickets 94 may be generated with one or more verification ticket restrictions that limit the use of the verification ticket 94 in one or more ways. Such verification ticket restrictions may be selected from a verification ticket restriction set, including a verification ticket duration restriction that limits the period of time when the verification ticket 94 is valid (e.g., a verification ticket 94 that is valid for two weeks from the date of generation); a verification ticket device restriction that limits the device(s) of the entity 16 from which the verification ticket 94 may be validly submitted (e.g., a verification ticket 94 that is only valid if submitted to the service from a particular device); a verification ticket entity restriction that limits the entities 16 who may validly submit the verification ticket 94; and a verification ticket use count restriction that limits the number of valid uses of the verification ticket 94 (e.g., a verification ticket 94 that is only valid to indicate the privilege level 20 of the entity 16 for one hundred uses). If the verification ticket restriction is violated (e.g., if the verification ticket duration restriction of the verification ticket 94 expires, or if the verification ticket 94 is transferred to a device that is not valid according to a verification ticket device restriction of the verification ticket 94), the device storing the verification ticket 94 and/or a service that subsequently receives the verification ticket 94 may invalidate the verification ticket 94 (e.g., by either disposing of the verification ticket 94, and/or by recording an identifier of the verification ticket 94 in a list of invalid verification tickets 94 that are not to be accepted). Alternatively or additionally, if a service receives a verification ticket 94 that violates one or more verification ticket restrictions, the service may reexamine the claim of the entity 16 to the asset(s) 32 for which the verification ticket 94 was originally generated (e.g., re-requesting the software licensing certificate from the entity 16, or examining a database of asset claims to determine whether the claim of the entity 16 to the asset 32 is still valid), and, if such claims are still valid, may generate and send to the entity 16 an updated verification ticket 94 having renewed verification ticket restrictions. Such reexamination and reissue of tickets may be advantageous, e.g., for allowing verification tickets 94 granting higher privilege levels 20 to be revoked, such as in the case of an abused asset identifier 36.

An exemplary scenario utilizing such techniques involves a restriction of verification tickets 94 to one or more devices, such as the devices operated by a particular entity 16. This verification ticket restriction may be achieved, e.g., by specifying within the verification ticket 94 a device identifier of a device that may validly submit the verification ticket 94 with a request to perform an activity 74. When an entity 16 submits a request from a particular device to a service to perform an activity 74, the device may be configured to send its device identifier, which the service may compare with the device identifiers indicated by the verification ticket 94, and may perform the activity 74 only if the device identifier of the device is specified by the verification ticket 94. This restriction may reduce the abuse of verification tickets 94 transferred from an authorized device to an unauthorized device. Additionally, one or more devices may be configured to store a non-verification ticket, which may represent a withholding of verification of any asset identifiers 36 of any assets 32 that may be received from the device; and a service may be configured to, upon receiving a non-verification ticket from a device, refuse to verify any asset identifiers 36 of any assets 32 received from the device. This technique may be advantageous, e.g., for devices that are used by many users (such as devices that are frequently lent to members of the public, or public terminals available in libraries and community centers) that are not to be utilized to request activities involving a privilege level from any service. Such devices may be effectively blacklisted by the services, and may not participate in activities involving a privilege level 20. Those of ordinary skill in the art may devise many ways of verifying claims of assets 32 submitted by entities 16 in accordance with the techniques presented herein.

A third aspect that may vary among embodiments of these techniques relates to actions that a service may perform upon detecting a malicious activity 28 of an entity 16. Such actions may relate to the entity 16 or the devices operated thereby; to the privilege level 20 assigned to the entity 16, to the asset identifiers 36 and/or verification tickets 94 of assets 32 claimed by the entity 16; and/or to the actual assets 32 claims by the entity 16.

As a first example of this third aspect, an embodiment of these techniques may be configured to, upon detecting an abuse of an asset 32, invalidate an asset identifier 36 of the asset 32. For example, if a software product is used by an entity 16 in a malicious manner, or if the software product is traded by an entity 16 in a manner that is inconsistent with a software license to the software product (e.g., a copyright violation), a license key assigned for the software product to the entity 16 may be invalidated. Such invalidation may result in a negation of the claim to the asset 32 by the entity 16, and a negation of the increase in the privilege level 20 of the entity 16 previously secured by the claim to the asset 32. Alternatively or additionally, such invalidation may also result in an inability of the entity 16 to utilize the asset 32 (e.g., an invalidation of the software license to the entity 16, resulting in an inability to run the software product on any devices operated by the entity 16). As one such example, an asset 32 may only be validly claimed by a small number of entities 16 (e.g., one), and attempts by several entities 16 to claim the asset 32 may result in an invalidation of the asset identifier 36 of the asset 32. This mechanism may be implemented, e.g., as an asset verification count limit that may be associated with the asset identifier 36 (such as a maximum number of entities 16 who may claim the asset 32) and an asset verification count that is incremented upon receiving each claim to the asset 32. An incrementing of the asset verification count above the asset verification count limit may be construed as an abuse of the asset 32 (e.g., a possible indicator of a license violation), and may result in an invalidation of the asset identifier 36 (e.g., the license key issued with the software license).

As a further example of this first example of this third aspect, respective verifications of an asset identifier 36 may be associated with a particular device operated by an entity 16 (e.g., verification tickets may include a verification ticket device restriction that indicates the device identifiers of devices that have claimed the asset identifier 36). For example, an entity 16 may be permitted to claim an asset 32 on a particular number of devices operated by the entity 16. If the asset verification count is incremented above the asset verification account limit, the service may present to the entity 16 a list of devices associated with the asset identifier 36 (e.g., the devices from which the asset identifier 36 has been claimed), and the entity 16 may be permitted to select a device to be dissociated from the asset identifier 36. If the entity 16 selects a device to be dissociated, the service may receive the selected device, dissociate the selected device from the asset identifier 36, decrement the asset verification count of the asset identifier 36, and reverse the raising of the privilege level of the entity that had been awarded in response to the entity's claim of the asset identifier 36. If the selected device subsequently submits the same asset identifier 36, the service may refuse to verify the asset identifier 36 on behalf of the selected device. In this manner, entities 16 may be permitted to dissociate devices from which an asset 32 has previously been claimed, thereby preserving the claims to the asset 32 by the other devices.

As a second example of this third aspect, an embodiment of these techniques may apply an action responsive to a detected abuse of an asset 32 to each of several entities 16 that are associated with the asset identifier 36. For example, if four entities 16 attempt to claim an asset 32 that may be validly claimed only by one entity 16 (e.g., a possible copyright violation of a software license that is extended only to one entity 16 and/or device), it may be presumed that all of the entities 16 attempting to claim the asset 32 are potentially involved in the abuse, and the effects thereof may be imputed to all four entities 16, e.g., by reducing the privilege level 20 of each entity 16. Conversely, if a privilege level 20 of an entity 16 is adjusted to a lower privilege level based on an activity 74 performed by the entity 16 (e.g., an attempt to perform a malicious activity 28), an embodiment of these techniques may identify all of the asset identifiers 36 of all assets 32 that have been claimed by the entity 16, and may invalidate all of the asset identifiers 36 associated with the entity 16. Those of ordinary skill in the art may devise many such actions that may be taken in response to a detected abuse of an asset 32 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
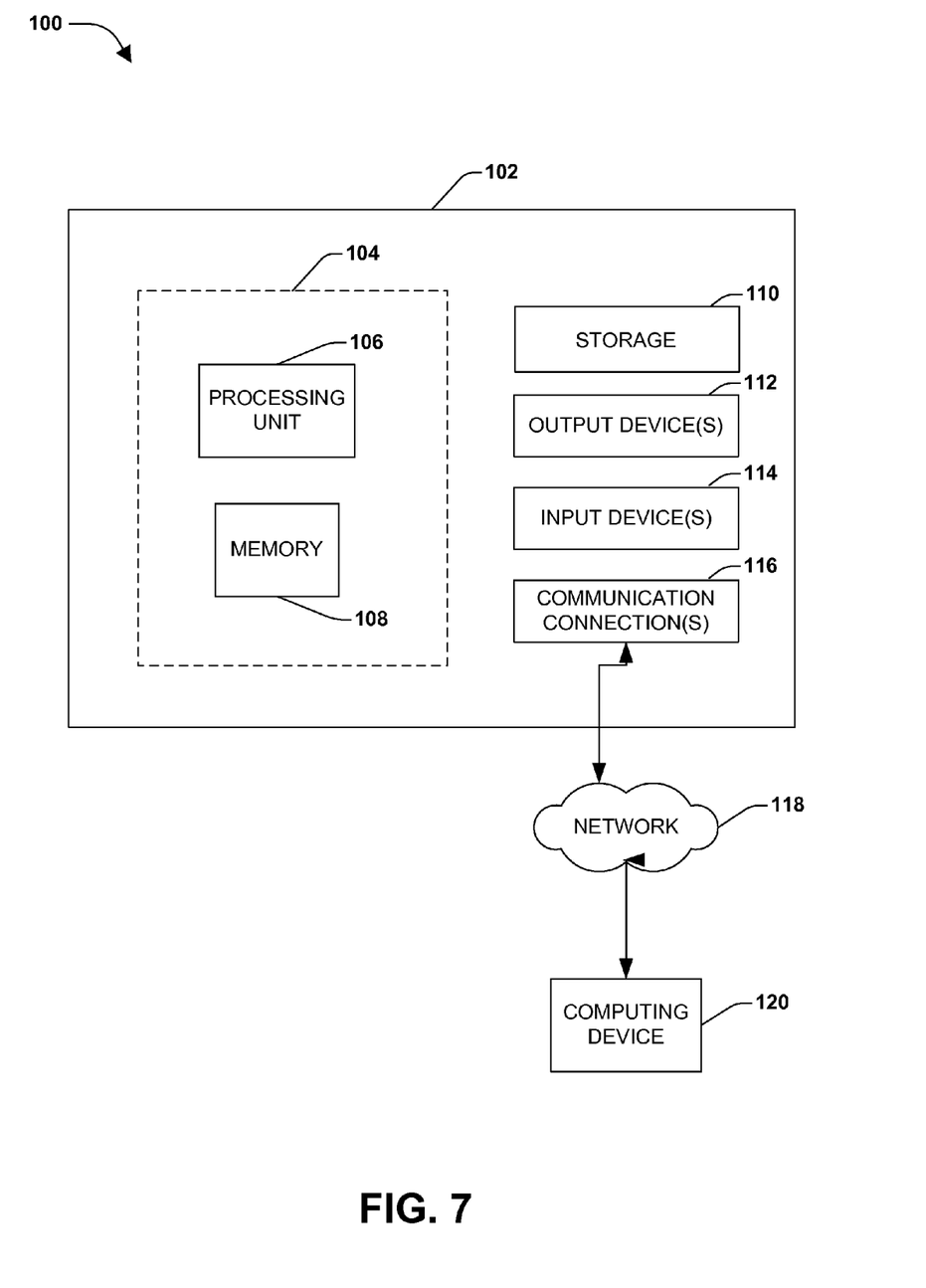
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 100 comprising a computing device 102 configured to implement one or more embodiments provided herein. In one configuration, computing device 102 includes at least one processing unit 106 and memory 108. Depending on the exact configuration and type of computing device, memory 108 may be volatile (such as RAM, for example), non-volatile (such as ROM, flash memory, etc., for example) or some combination of the two. This configuration is illustrated in FIG. 7 by dashed line 104.

In other embodiments, device 102 may include additional features and/or functionality. For example, device 102 may also include additional storage (e.g., removable and/or non-removable) including, but not limited to, magnetic storage, optical storage, and the like. Such additional storage is illustrated in FIG. 7 by storage 110. In one embodiment, computer readable instructions to implement one or more embodiments provided herein may be in storage 110. Storage 110 may also store other computer readable instructions to implement an operating system, an application program, and the like. Computer readable instructions may be loaded in memory 108 for execution by processing unit 106, for example.

The term "computer readable media" as used herein includes computer storage media. Computer storage media includes volatile and nonvolatile, removable and non-removable media implemented in any method or technology for storage of information such as computer readable instructions or other data. Memory 108 and storage 110 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 102. Any such computer storage media may be part of device 102.

Device 102 may also include communication connection(s) 116 that allows device 102 to communicate with other devices. Communication connection(s) 116 may include, but is not limited to, a modem, a Network Interface Card (NIC), an integrated network interface, a radio frequency transmitter/receiver, an infrared port, a USB connection, or other interfaces for connecting computing device 102 to other computing devices. Communication connection(s) 116 may include a wired connection or a wireless connection. Communication connection(s) 116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 102 may include input device(s) 114 such as keyboard, mouse, pen, voice input device, touch input device, infrared cameras, video input devices, and/or any other input device. Output device(s) 112 such as one or more displays, speakers, printers, and/or any other output device may also be included in device 102. Input device(s) 114 and output device(s) 112 may be connected to device 102 via a wired connection, wireless connection, or any combination thereof. In one embodiment, an input device or an output device from another computing device may be used as input device(s) 114 or output device(s) 112 for computing device 102.

Components of computing device 102 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 102 may be interconnected by a network. For example, memory 108 may be comprised of multiple physical memory units located in different physical locations interconnected by a network.

Those skilled in the art will realize that storage devices utilized to store computer readable instructions may be distributed across a network. For example, a computing device 120 accessible via network 118 may store computer readable instructions to implement one or more embodiments provided herein. Computing device 102 may access computing device 120 and download a part or all of the computer readable instructions for execution. Alternatively, computing device 102 may download pieces of the computer readable instructions, as needed, or some instructions may be executed at computing device 102 and some at computing device 120.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of providing a service to an entity using a device having a processor, the method comprising:
    executing on the processor instructions configured to:
        assign to the entity a privilege level for accessing the service;
        upon detecting an activity of the entity, adjust the privilege level of the entity based upon the activity; and
        upon receiving from the entity a software license identifier verifying an acquisition of a software license by the entity for a software asset that is unrelated to the service:
            verify the software license identifier of the acquisition of the software license of the software asset by the entity; and
            upon verifying the software license identifier, raise the privilege level of the entity.

2. The method of claim 1:
    the device comprising an alternative software license verification technique; and
    the instructions configured to, upon receiving a request from an entity to raise the privilege level of the entity:
        present to the entity an asset-based software license verification option and an alternative software license verification option;
        upon receiving from the entity a selection of the asset-based software license verification option, request from the entity a software license identifier verifying the acquisition of the software license of the software asset by the entity; and
        upon receiving from the entity a selection of the alternative verification option, invoke the alternative software license verification technique.

3. The method of claim 2, wherein the alternative software license verification technique further comprises:
    presenting to the entity an image and a request for the entity to identify at least one symbol present in the image; and
    upon receiving from the entity an identification of the symbol in the image, raising the privilege level of the entity.

4. The method of claim 1:
    the device comprising a service provided to respective entities with a service quality associated with the privilege level of the entity; and
    the instructions configured to provide the service to the entity at the service quality associated with the privilege level of the entity.

5. The method of claim 1:
    the software license acquired by the entity at software license cost; and
    raising the privilege level of the entity comprising: raising the privilege level of the entity proportional to the software license cost of the software license of the software asset.

6. The method of claim 1:
    the software license identifier verifiable by a software licensing service; and
    the instructions configured to:
        send the software license identifier to the software licensing service, and
        receive from the software licensing service a verification of the software license identifier.

7. The method of claim 6, the instructions configured to:
upon receiving the verification of the software licensing identifier from the software licensing service:
generate a verification ticket representing the verification of the software licensing identifier, and
send the verification ticket to the entity; and
verifying the software license identifier comprising:
receiving from the entity a verification ticket, and
verifying the verification ticket of the entity.

8. The method of claim 7, the verification ticket comprising a verification ticket restriction.

9. The method of claim 8, the verification ticket restriction selected from a verification ticket restriction set comprising:
a verification ticket duration restriction;
a verification ticket device restriction;
a verification ticket entity restriction; and
a verification ticket use count restriction.

10. The method of claim 8, the instructions configured to, upon receiving a verification ticket violating at least one verification ticket restriction, invalidate the verification ticket.

11. The method of claim 8, the instructions configured to, upon receiving a verification ticket violating at least one verification ticket restriction:
request the software licensing identifier from the entity; and
upon receiving the verification of the software licensing certificate from the software licensing service:
generate an updated verification ticket representing the verification of the software licensing identifier, and
send the updated verification ticket to the entity.

12. The method of claim 8:
respective verification tickets comprising at least one device identifier of at least one device; and
verifying the asset identifier comprising:
receiving at least one device identifier from a device sending the verification ticket, and
verifying that the verification ticket comprises the at least one device identifier of the device.

13. The method of claim 12:
at least one device comprising a non-verification ticket representing a withholding of verification of software license identifiers received from the device; and
verifying the asset identifier comprising: upon receiving a non-verification ticket from the device, refusing to verify software license identifiers received from the device.

14. The method of claim 1, the instructions configured to, upon detecting an abuse of a software license, invalidate the software license identifier of the software license of the software asset.

15. The method of claim 14:
at least one software license identifier associated with a software license verification count limit;
verifying the software license identifier comprising: upon verifying the software license identifier, increment a software license verification count of the software license identifier; and
detecting an abuse of the software license comprising: incrementing the software license verification count above the software license verification count limit.

16. The method of claim 15:
respective verifications of a software license identifier associated with a device; and
the instructions configured to, upon incrementing the software license verification count of the software license identifier above the software license verification count limit:
present a list of devices associated with the software license identifier;
upon receiving a selected device to be dissociated with the software license identifier:
dissociate the selected device from the software license identifier, and
decrement the asset verification count of the software license identifier; and
verifying the software license identifier comprising: upon receiving the software license identifier from a selected device that has been dissociated from the software license identifier, refusing to verify the software license identifier.

17. The method of claim 14, the instructions configured to, upon invalidating a software license identifier of a software license of a software asset:
identify at least one entity associated with the software license identifier, and
reduce the privilege level of the entity.

18. The method of claim 1, the instructions configured to, upon adjusting the privilege level of an entity to a lower privilege level based upon an activity:
identify at least one software license identifier associated with the entity, and
invalidate the at least one software license identifier.

19. A system configured to provide a service level to an entity on a device having a memory and a processor, the system comprising:
an entity privilege initiator comprising instructions stored in the memory that, when executed on the processor, cause the device to assign to the entity a privilege level for accessing the service;
an entity monitor comprising instructions stored in the memory that, when executed on the processor, cause the device to, upon detecting an activity of the entity, adjust the privilege level of the entity based upon the activity; and
an entity asset verifier comprising instructions stored in the memory that, when executed on the processor, cause the device to, upon receiving from the entity a software license identifier of an acquisition of a software license by the entity for a software asset that is unrelated to the service:
verifying the software license identifier of the acquisition of the software license of the software asset by the entity; and
upon verifying the software license identifier, raising the privilege level of the entity.

20. A memory device storing instructions that, when executed on a processor of a device, cause the device to provide a service to an entity by:
assigning to the entity a privilege level for accessing the service;
upon detecting an activity within the service of the entity, adjusting the privilege level of the entity based upon the activity; and
upon receiving from the entity a software license identifier of an acquisition of a software license by the entity for a software asset that is unrelated to the service:
verifying the software license identifier of the acquisition of the software license of the software asset by the entity; and
upon verifying the software license identifier, raising the privilege level of the entity.

* * * * *